(12) United States Patent
Kuwabara et al.

(10) Patent No.: US 10,531,057 B2
(45) Date of Patent: Jan. 7, 2020

(54) VEHICLE-MOUNTED DISPLAY DEVICE

(71) Applicant: PANASONIC INTELLECTUAL PROPERTY MANAGEMENT CO., LTD., Osaka (JP)

(72) Inventors: Takashi Kuwabara, Kanagawa (JP); Masanobu Kanaya, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/088,614

(22) PCT Filed: Jan. 25, 2017

(86) PCT No.: PCT/JP2017/002437
§ 371 (c)(1),
(2) Date: Sep. 26, 2018

(87) PCT Pub. No.: WO2017/169024
PCT Pub. Date: Oct. 5, 2017

(65) Prior Publication Data
US 2019/0110035 A1    Apr. 11, 2019

(30) Foreign Application Priority Data
Mar. 31, 2016 (JP) ................. 2016-072297

(51) Int. Cl.
*H04N 9/64* (2006.01)
*H04N 7/18* (2006.01)
(Continued)

(52) U.S. Cl.
CPC ............ *H04N 9/643* (2013.01); *B60R 1/00* (2013.01); *B60R 1/12* (2013.01); *H04N 7/18* (2013.01);
(Continued)

(58) Field of Classification Search
CPC ..... B60R 1/00; B60R 1/12; B60R 2001/1253; B60R 2300/105; B60R 2001/1215;
(Continued)

(56) References Cited

U.S. PATENT DOCUMENTS 9,495,603 B2 * 11/2016 Hegemann ............. G01S 17/89
9,936,146 B2 *  4/2018 Takami .................... H04N 9/04
(Continued)

FOREIGN PATENT DOCUMENTS

JP    2007-243464    9/2007
JP    2011-008459    1/2011
(Continued)

OTHER PUBLICATIONS

Official Communication issued in International Pat. Appl. No. PCT/JP2017/002437, dated Apr. 25, 2017.

*Primary Examiner* — Nathnael Aynalem
(74) *Attorney, Agent, or Firm* — Greenblum & Bernstein, P.L.C.

(57) ABSTRACT

A vehicle-mounted display device includes an imaging unit, a traveling state determination unit, a hue discriminator, a color difference correction unit, and a display. The imaging unit captures an image of a surrounding of a vehicle. The traveling state determination unit determines whether the vehicle is traveling in a tunnel. The hue discriminator discriminates a hue of the image when the traveling state determination unit determines that the vehicle is traveling in a tunnel. The color difference correction unit corrects color difference information about the image in accordance with a discrimination result of the hue discriminator. The display displays the image corrected by the color difference correction unit.

7 Claims, 14 Drawing Sheets

(51) Int. Cl.
*H04N 9/73* (2006.01)
*B60R 1/00* (2006.01)
*B60R 1/12* (2006.01)

(52) U.S. Cl.
CPC . *B60R 2001/1253* (2013.01); *B60R 2300/105* (2013.01)

(58) Field of Classification Search
CPC ...... H04N 7/18; H04N 9/643; G06K 9/00778; G06K 9/00785; G06K 9/00791; G06K 9/00798; G06K 9/00805; G06K 9/00812; G06K 9/00818; G06K 9/00825; G06K 9/00845; G06K 9/325; G06K 2209/15; G06T 2207/30236; G06T 2207/30248; G06T 2207/30252; G06T 2207/30256; G06T 2207/30261; G06T 2207/30264; G06T 2207/30268; G08G 1/16; G08G 1/116; B60W 50/14; B60W 2050/143; B60W 2550/10; B60W 2550/14

USPC ........................................................ 348/148
See application file for complete search history.

(56) References Cited

U.S. PATENT DOCUMENTS

| | | | |
|---|---|---|---|
| 2006/0287826 A1* | 12/2006 | Shimizu | B60K 35/00 701/431 |
| 2007/0024467 A1* | 2/2007 | Fujii | G06K 9/00791 340/937 |
| 2007/0236510 A1* | 10/2007 | Kakuta | G06T 11/00 345/632 |
| 2015/0326840 A1* | 11/2015 | Usui | H04N 9/735 348/148 |

FOREIGN PATENT DOCUMENTS

| | | |
|---|---|---|
| JP | 2011-254311 | 12/2011 |
| JP | 2014-049918 | 3/2014 |
| JP | 2015-177371 | 10/2015 |

* cited by examiner

VEHICLE-MOUNTED DISPLAY DEVICE

This application is a U.S. national stage application of the PCT International Application No. PCT/JP2017/002437 filed on Jan. 25, 2017, which claims the benefit of foreign priority of Japanese patent application 2016-072297 filed on Mar. 31, 2016, the contents all of which are incorporated herein by reference.

TECHNICAL FIELD

The present invention relates to a vehicle-mounted display device as an electronic mirror device.

BACKGROUND ART

The electronic mirror device in which a vehicle-mounted camera and a display are combined is recently put into practical use. The electronic mirror device is expected as a substitute for a rearview mirror (including a vehicle interior rearview mirror such as a windshield rearview mirror and a vehicle exterior rearview mirror such as a side mirror (door mirror)). An image of a surrounding of a vehicle, which is captured by the vehicle-mounted camera, is displayed on the display in the vehicle-mounted display device such as the electronic mirror device.

What is called color fogging is generated in the captured image by an influence of a light source or the like. White balance adjustment is performed in order to correct the color fogging. The white balance adjustment is usually performed so that, assuming that the vehicle is traveling outside, the color fogging is eliminated under sunlight. When the vehicle is traveling outside, the captured image having the natural hue is obtained by the white balance adjustment.

In the case that parking support is performed using an overhead image obtained by combining a plurality of captured images of a surrounding of the vehicle, part of the captured images may have a different hue due to a break lamp or direction indicator being turned on. For this reason, there has been proposed hue stabilization performed by luminance correction of the captured image (For example, see PTLs 1, 2).

CITATION LIST

Patent Literatures

PTL 1: Unexamined Japanese Patent Publication No. 2007-243464
PTL 2: Unexamined Japanese Patent Publication No. 2011-008459

SUMMARY OF THE INVENTION

The present invention provides a vehicle-mounted display device that can display the image captured during traveling inside a tunnel with a natural hue as a whole.

According to one aspect of the present invention, a vehicle-mounted display device includes an imaging unit, a traveling state determination unit, a hue discriminator, a color difference correction unit, and a display. The imaging unit captures an image of a surrounding of a vehicle. The traveling state determination unit determines whether the vehicle is traveling in a tunnel. The hue discriminator discriminates a hue of the image when the traveling state determination unit determines that the vehicle is traveling in a tunnel. The color difference correction unit corrects color difference information about the image in accordance with a discrimination result of the hue discriminator. The display displays the image corrected by the color difference correction unit.

DESCRIPTION OF EMBODIMENTS

Figure 1:
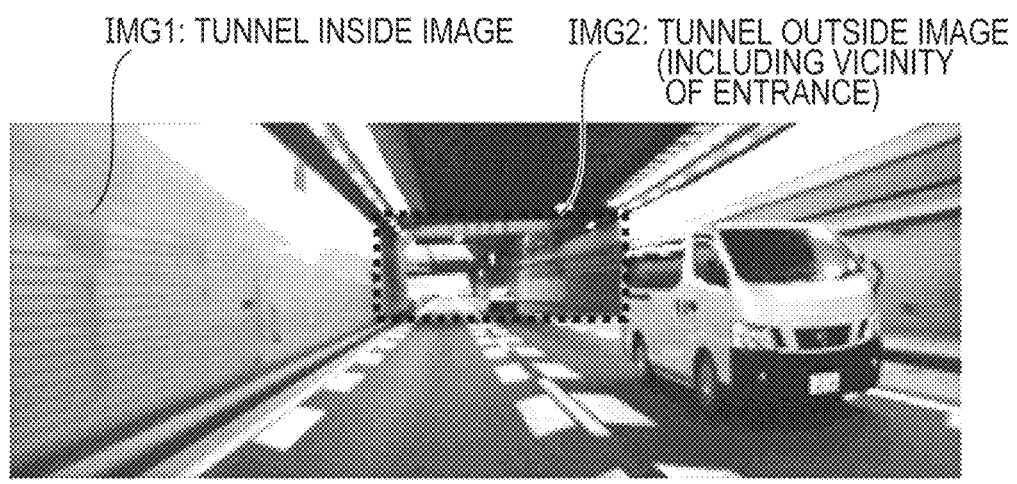
FIG. 1 is a view illustrating an example of a captured image during traveling inside a tunnel.

Prior to description of exemplary embodiments of the present invention, problems found in a conventional technique will be briefly described herein. When the vehicle is traveling inside the tunnel, particularly when the vehicle enters the tunnel, tunnel inside image IMG1 having a dark light source and tunnel outside image IMG2 (surrounded by a broken line of FIG. 1) having a bright light source are mixed as illustrated in FIG. 1. The hue of tunnel outside image IMG2 is naturally displayed by the white balance adjustment, but the hue of tunnel inside image IMG1 becomes different from the actually-seen hue, which possibly causes a driver to feel uneasy.

When the hue of tunnel inside image IMG1 is matched by applying the conventional luminance correction, the hue of tunnel outside image IMG2 changes and becomes different from the actual hue. For example, in the case that tunnel inside image IMG1 is seen close to yellow, yellowish tunnel inside image IMG1 can be suppressed by performing correction of increasing luminance of a blue component, but whitish tunnel outside image IMG2 is displayed bluish. Thus, in the luminance correction of the specific color component, the tunnel image is hardly displayed with the natural hue.

Hereinafter, exemplary embodiments of the present invention will be described in detail with reference to the drawings.

First Exemplary Embodiment

Figure 2:
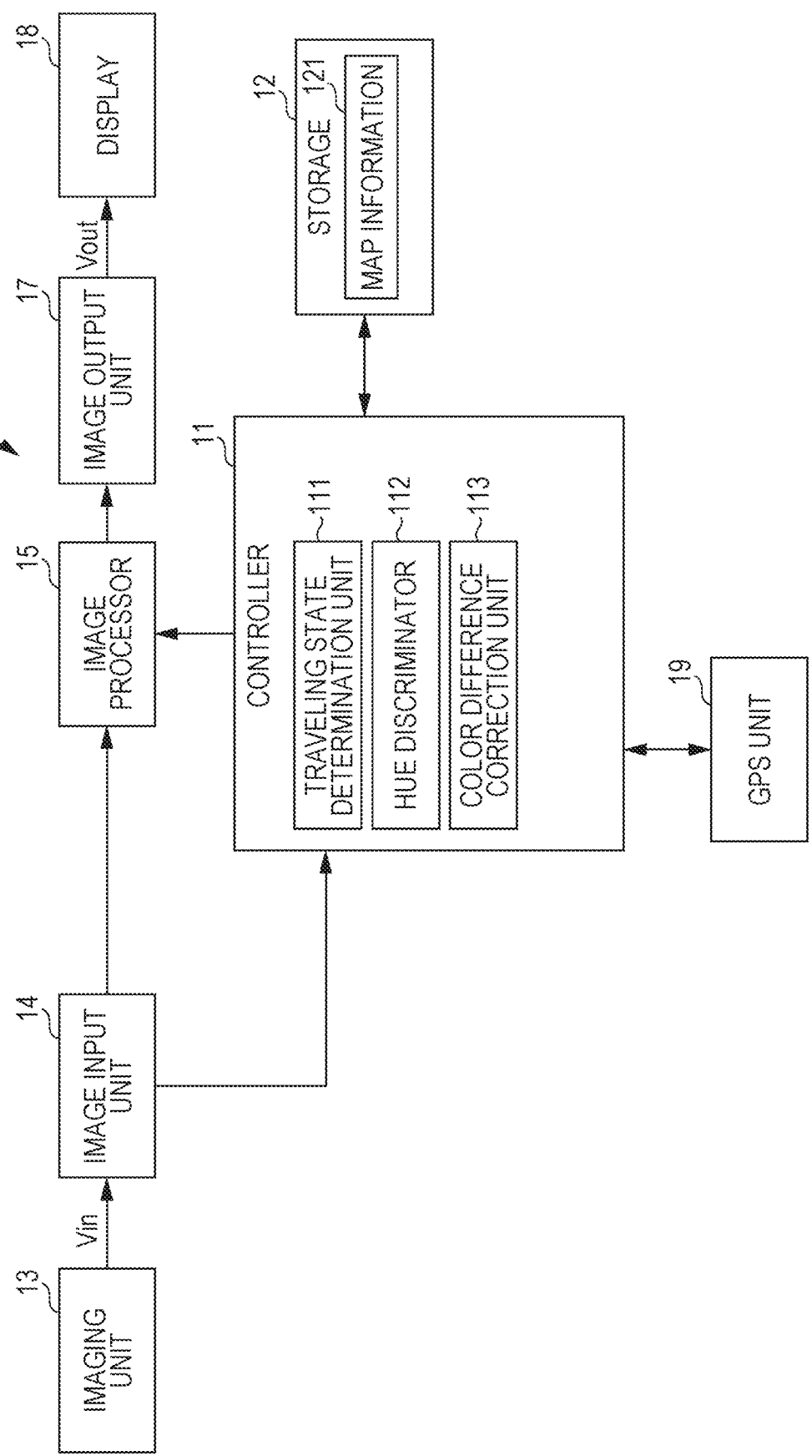
FIG. 2 is a view illustrating a vehicle-mounted display device according to a first exemplary embodiment.

FIG. 2 is a view illustrating vehicle-mounted display device 1A according to a first exemplary embodiment. Vehicle-mounted display device 1A is an electronic mirror device that displays an image captured by imaging unit 13 on display 18. For example, vehicle-mounted display device 1A is used instead of a windshield rearview mirror or a side mirror.

As illustrated in FIG. 2, vehicle-mounted display device 1A includes controller 11, storage 12, imaging unit 13, image input unit 14, image processor 15, image output unit 17, display 18, and GPS (Global Positioning System) unit 19.

Controller 11 includes a CPU (Central Processing Unit), a ROM (Read Only Memory), and a RAM (Random Access Memory) (all units are not illustrated). The CPU reads a program from the ROM according to a processing content, develops the program in the RAM, and performs centralized control of operation of each block of vehicle-mounted display device 1A in conjunction with the developed program. Controller 11 acts as traveling state determination unit 111, hue discriminator 112, and color difference correction unit 113. These functions of the units will be described in detail with reference to a flowchart in FIG. 4.

Storage 12 is an auxiliary storage device such as an HDD (Hard Disk Drive) and an SSD (Solid State Drive). Storage 12 stores map information 121 and the like.

Figure 3:
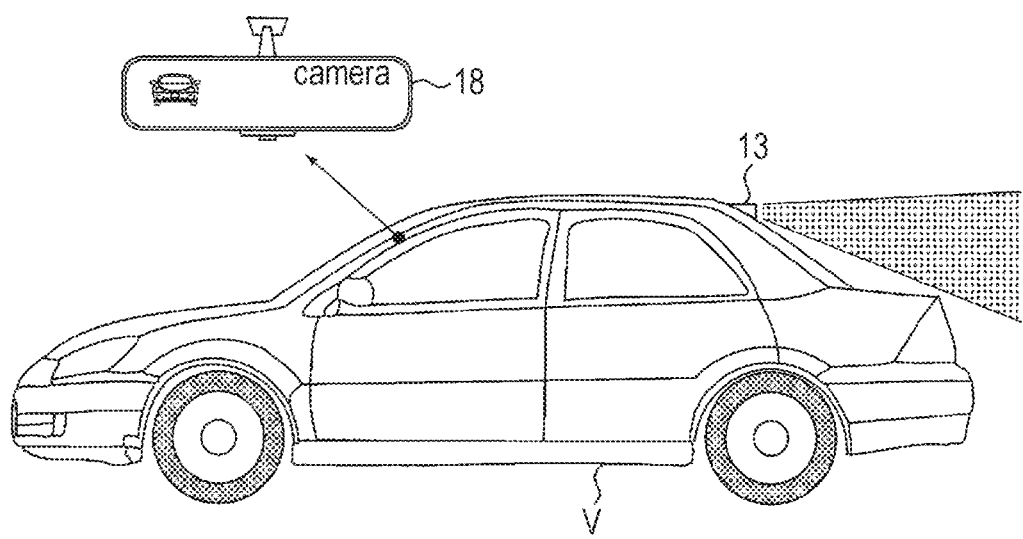
FIG. 3 is a view illustrating installation states of a display and an imaging unit.

For example, imaging unit 13 is disposed on a rear windshield of vehicle V (see FIG. 3). Imaging unit 13 includes an optical element such as a lens and an imaging element such as a CCD (Charge-Coupled Device) image sensor or a CMOS (Complementary Metal Oxide Semiconductor) image sensor. The optical element forms an image of received light on the imaging element. The imaging element converts an optical image formed by the optical element into an electric signal (RGB signal). Imaging unit 13 transmits input image signal $V_{in}$ based on the RGB signal generated by the imaging element to image input unit 14 by wireless communication or wired communication. For example, input image signal $V_{in}$ is a YCbCr signal generated by converting the RGB signal into luminance signal Y and two color difference signals Cb, Cr.

Image input unit 14 extracts image information (input image information) included in input image signal $V_{in}$ from imaging unit 13, and outputs the image information to image processor 15 and controller 11. Image output unit 17 converts the image information from image processor 15 into image information of RGB format, and outputs the converted image information as output image signal $V_{out}$.

Image processor 15 performs various pieces of correction processing such as luminance adjustment, white balance adjustment, sharpness adjustment, and contrast adjustment on the input image information. In the first exemplary embodiment, image processor 15 corrects the input image such that a hue of the captured image during traveling inside a tunnel is naturally expressed. It is assumed that the setting of the white balance adjustment is based on the case that the vehicle is traveling outside the tunnel.

For example, display 18 is a liquid crystal display including a display panel and a backlight (not illustrated), and is attached to a center in an upper portion of a front windshield in a vehicle interior (see FIG. 3). Display 18 performs image display based on output image signal $V_{out}$ from image output unit 17. An organic EL (Electroluminescence) display may be applied to display 18.

GPS unit 19 includes a GPS receiver that detects (measures) a position of an own vehicle based on a radio wave transmitted from a satellite, a gyroscope sensor that detects a rotational angular velocity of the own vehicle, and an acceleration sensor.

In vehicle-mounted display device 1A, when the vehicle is traveling inside the tunnel, particularly when the vehicle enters the tunnel, tunnel inside image IMG1 having a dark light source and tunnel outside image IMG2 having a bright light source are mixed (see FIG. 1). The hue of tunnel outside image IMG2 is naturally displayed by the white balance adjustment, but the hue of tunnel inside image IMG1 is displayed different from the actually-seen hue. In the first exemplary embodiment, image processing different from that during the traveling outside the tunnel (tunnel inside image processing) is performed during the traveling inside the tunnel, which allows the image captured during the traveling inside the tunnel to be displayed with the natural hue as a whole. It is considered that the hue inside the tunnel is one of the hue close to orange, the hue close to yellow, and the hue close to green because the hue inside the tunnel depends on the light source of the tunnel.

Figure 4:
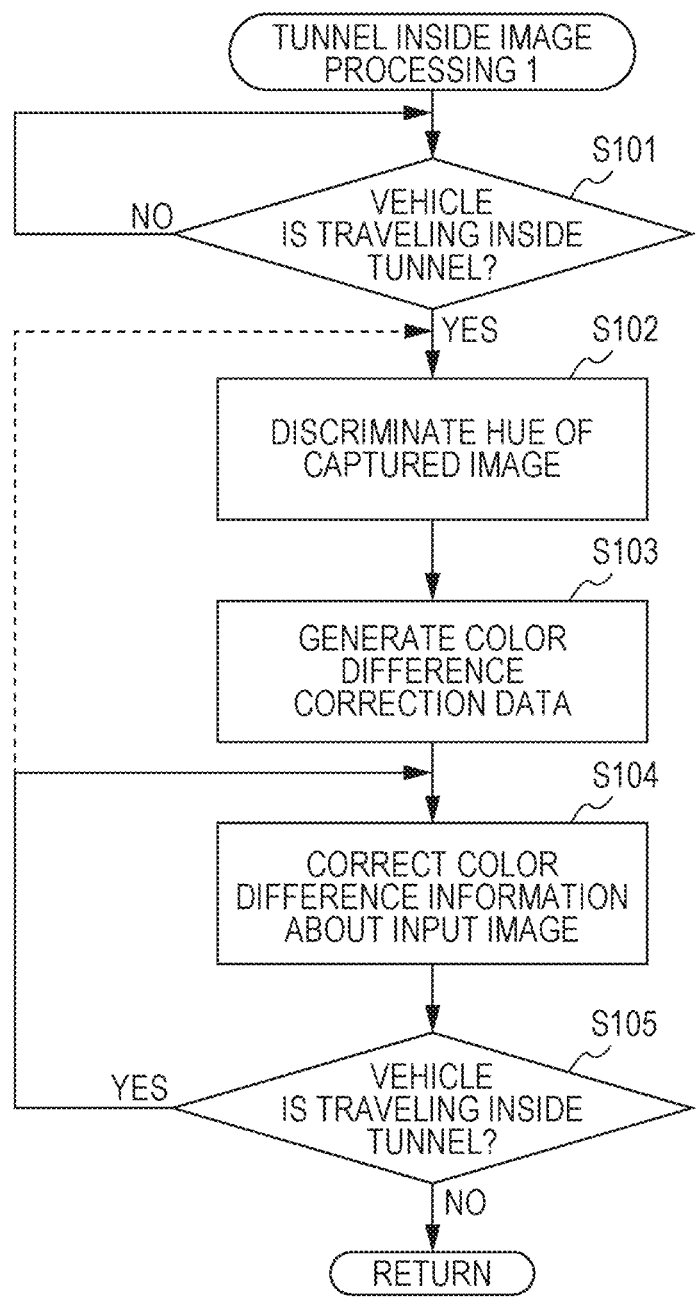
FIG. 4 is a flowchart illustrating an example of image processing in the first exemplary embodiment.

FIG. 4 is a flowchart illustrating an example of the tunnel inside image processing in the first exemplary embodiment. For example, CPU 111 calls an image processing program stored in the ROM in association with the activation of vehicle-mounted display device 1A, and executes the image processing program, thereby performing the tunnel inside image processing.

In step S101, controller 11 determines whether the vehicle is traveling in the tunnel (the processing is performed by traveling state determination unit 111). When controller 11 determines that the vehicle is traveling in the tunnel (YES in step S101), the flowchart transfers to the processing in step S102. The processing in step S101 is repeated until controller 11 determines that the vehicle is traveling in the tunnel (NO in step S101).

Specifically, controller 11 extracts feature amounts such as average values, maximum values, and minimum values of pieces of color information R, G, B (value range of 0 to 255) about color components, luminance Y and pieces of color difference information Cb, Cr in a feature amount extraction area (for example, all pixels) of the input image. Controller 11 determines whether currently traveling position is inside or outside the tunnel based on the feature amount.

At this point, luminance Y is given by the following equation (1) using the pieces of color information R, G, B. Blue color difference information Cb is information in which a (B-Y) value derived from the equation (1) is normalized such that a value range falls within a range of −128 to +127. Red color difference information Cr is information in which an (R-Y) value derived from the equation (1) is normalized such that the value range falls within the range of −128 to +127.

$$Y=0.2126 \times R+0.7152 \times G+0.0722 \times B \qquad (1)$$

For example, using the fact that luminance Y is equal to color information B of the blue component (hereinafter, referred to as blue information B) in the outside of the tunnel, and that blue information B is weaker than luminance Y in the inside of the tunnel, a determination that the vehicle is traveling inside the tunnel is made in the case that the average value of blue information B in the feature amount extraction area is less than 30. For example, the determination that the vehicle is traveling inside the tunnel is made in the case that a number of pixels having blue information B less than 30 is greater than or equal to a predetermined value in the feature amount extraction area.

Controller 11 may determine whether the vehicle is traveling inside the tunnel based on a detection value of an illuminance sensor installed in the vehicle or turn-on and -off of a headlight switch (illumination signal). For example, controller 11 may determine whether the vehicle is traveling inside the tunnel by comparing own vehicle position information acquired from GPS unit 19 to map information 121.

In step S102, controller 11 discriminates what color the light source (lighting) inside the tunnel is close to, namely, discriminates the hue of the captured image (the processing is performed by hue discriminator 112). Controller 11 extracts feature amounts such as the average values, maximum values, and minimum values of pieces of color information R, G, G about the color components, luminance Y, and the pieces of color difference information Cb, Cr in the feature amount extraction area (for example, all the pixels) of the input image, and discriminates the hue of the captured image based on the feature amount.

For example, controller 11 calculates R/G with respect to each pixel in the feature amount extraction area, and determines that the hue is close to orange in the case that average value R1/G1 satisfies 1.3<R1/G1. Controller 11 determines that, the hue is close to yellow in the case that average value R1/G1 satisfies 1.1<R1/G1≤1.3, and determines that the hue is close to green in the case that average value R1/G1 satisfies R1/G1≤1.1.

For example, controller 11 calculates R/G with respect to each pixel in the feature amount extraction area, and determines that the hue is close to orange in the case that the number of pixels satisfying 1.3<R/G is greater than or equal to a predetermined value. Controller 11 determines that the hue is close to yellow in the case that the number of pixels satisfying 1.1<R/G≤1.3 is greater than or equal to a predetermined value, and determines that the hue is close to green in the case that the number of pixels satisfying R/G≤1.1 is greater than or equal to a predetermined value.

Controller 11 calculates average value R2 of red information R and average value G2 of green information G in the feature amount extraction area, and determines that the hue is close to orange in the case that ratio R2/G2 satisfies 1.3<R2/G2. Controller 11 determines that the hue is close to yellow in the case that ratio R2/G2 satisfies 1.1<R2/G2≤1.3, and determines that the hue is close to green in the case that ratio R2/G2 satisfies R2/G2≤1.1.

The hue is close to orange or yellow in the case that the lighting installed in the tunnel is a low-pressure or high-pressure sodium lamp, and the hue is close to green in the case that the lighting is a fluorescent lamp or a fluorescent mercury lamp. The hue is close to white in the case that the lighting is a metal halide lamp or a ceramic metal halide lamp. The necessity of the hue correction is eliminated in the case that the hue of the captured image is close to white.

At this point, the feature amount extraction area in the captured image may be set to right and left areas excluding a center of the image. Consequently, the image outside the tunnel and the image of the following vehicle, which may exist in the center of the image, are excluded from a discrimination target, and a tunnel inner wall serves mainly as the discrimination target, so that the hue of the captured image can properly be discriminated.

The processing in step S102 is performed immediately after the determination that the vehicle is traveling inside the tunnel in step S101. It is preferable that the hue is discriminated on a predetermined cycle (for example, cycle of 0.5 seconds), and the hue is decided in the case that the same discrimination result is obtained consecutively a given number of times. Consequently a variation of the discrimination result can be prevented.

Controller 11 may directly acquire a detection signal (received light intensity) of imaging unit 13, and discriminate the hue of the captured image from the average value of the detection signal. For example, tunnel lighting information (such as the sodium lamp, the fluorescent lamp, and the fluorescent mercury lamp) may be correlated with map information 121. In this case, controller 11 may detect the tunnel in which the vehicle is traveling by comparing the own vehicle position information acquired from GPS unit 19 to map information 121, and discriminate the hue of the captured image based on the lighting information correlated with the detected tunnel.

In step S103, controller 11 generates a Cb correction curve and a Cr correction curve as color difference correction data used to correct the pieces of color difference information Cb, Cr based on the hue of the captured image discriminated in step S102 (the processing is performed by color difference correction unit 113).

Figure 5:
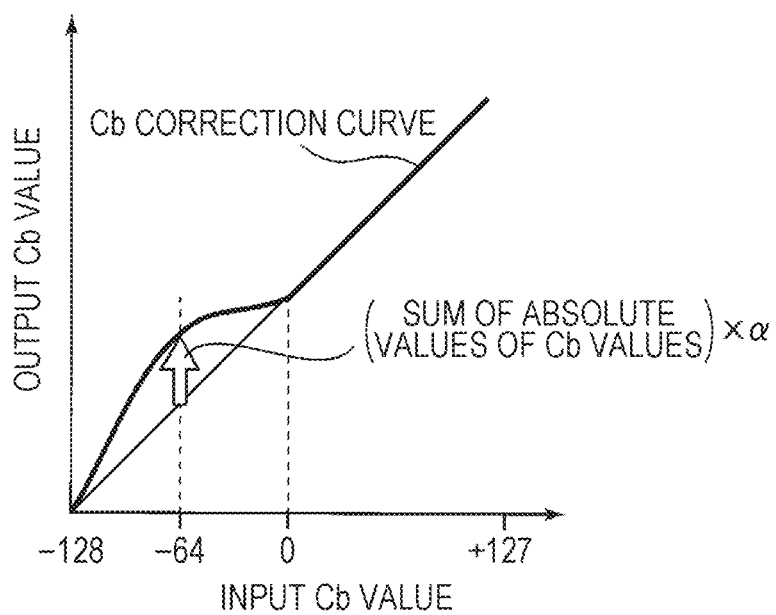
FIG. 5 is a view illustrating an example of a method for generating blue color difference data.

For example, blue color difference correction data (Cb correction curve) used to correct blue color difference information Cb is generated with a negative area of the Cb correction curve upwardly-protruded in proportion to a sum of absolute values of Cb values of the pixels in the feature amount extraction area. That is, as illustrated in FIG. 5, the Cb correction curve is generated by raising an output Cb value at a middle point in the negative area of the Cb correction curve (input Cb value=−64) by (the sum of the absolute values of the Cb values)×α, and connecting the other points smoothly. That is, the Cb correction curve is generated by converting the Cb information having the input Cb value less than or equal to a first threshold (in this case, 0) so as to make an output value greater than an input value without converting the Cb information having the input Cb value greater than the first threshold.

Figure 6:
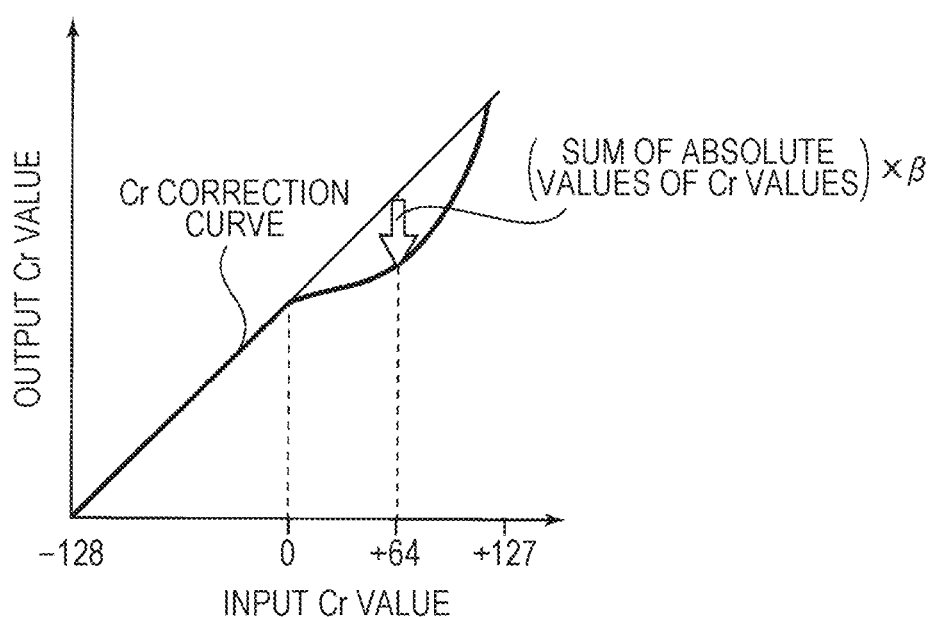
FIG. 6 is a view illustrating an example of a method for generating red color difference data.

Similarly red color difference correction data (Cr correction curve) used to correct red color difference information Cr is generated with a positive area of the Cr correction curve downwardly-protruded in proportion to a sum of absolute values of Cr values of the pixels in the feature amount extraction area. That is, as illustrated in FIG. 6, the Cr correction curve is generated by lowering an output Cr value at a middle point in the positive area of the Cr correction curve (input Cr value=+64) by (the sum of the absolute values of the Cr values)×β, and connecting the other points smoothly. That is, the Cr correction curve, the conversion is generated by converting the Cr information having the input Cr value greater than or equal to a second threshold (in this case, 0) so as to make an output value smaller than an input value without converting the Cr information having the input Cr value smaller than the second threshold.

The Cb correction curve may be generated with the negative area of the Cb correction curve upwardly-protruded in proportion to the absolute value of Cb/Y of each pixel in the feature amount extraction area. Similarly the Cr correction curve may be generated with the positive area of the Cr correction curve downwardly-protruded in proportion to the absolute value of Cr/Y of each pixel in the feature amount extraction area. The first threshold in generating the Cb correction curve and the second threshold in generating the Cr correction curve may be changed in a positive or negative direction according to the discriminated hue (see FIGS. 12A to 12C).

In step S104, controller 11 controls image processor 15 to correct blue color difference information Cb and red color difference information Cr of the input image according to the color difference correction data (Cb correction curve and Cr correction curve) obtained in step S103 (the processing is performed by color difference correction unit 113). The image, which is subjected to the color difference correction to improve the hue, is displayed on display 18.

In step S105, similarly to step S101, controller 11 determines whether the vehicle is traveling inside the tunnel (the processing is performed by traveling state determination unit 111). When controller 11 determines that the vehicle does not travel inside the tunnel, namely when controller 11 determines that the vehicle has gone out of the tunnel (NO in step S105), a series of pieces of tunnel inside image processing is ended, and the flowchart transfers to the processing in step S101. When controller 11 determines that the vehicle is traveling inside the tunnel (YES in step S105), the flowchart transfers to the processing in step S104. That is, the color difference information is corrected according to the generated color difference correction data until the vehicle has gone out of the tunnel.

When the determination that the vehicle is traveling inside the tunnel is made in step S105, as illustrated in a broken line in FIG. 4, the flowchart may transfer to the processing in step S102 to deal with a change in hue. In this case, the hue discrimination is performed, and when the hue changes, the color difference correction data is generated again according to the changed hue. For example, the case that a vicinity of a tunnel entrance differs from the tunnel inside in the hue can be dealt with.

In the area indicating the tunnel inside having strong yellow, blue color difference information Cb becomes negative, and red color difference information Cr becomes positive. On the other hand, in the area indicating the tunnel outside, blue color difference information Cb becomes 0 or becomes slightly larger than 0, and red color difference information Cr becomes 0 or becomes slightly smaller than 0. Thus, when the correction is performed on the captured image during the traveling inside the tunnel according to the Cb correction curve and the Cr correction curve, the blue of the pixel corresponding to the area indicating the tunnel inside is strengthened while the red is suppressed, and therefore yellow is suppressed. On the other hand, the hue of the pixel corresponding to the area indicating the tunnel outside is not corrected. That is, the hue is corrected only on the pixel corresponding to the area indicating the tunnel inside.

As described above, vehicle-mounted display device 1A of the first exemplary embodiment includes imaging unit 13, traveling state determination unit 111, hue discriminator 112, color difference correction unit 113, and display 18. Imaging unit 13 captures the image of a surrounding of the vehicle. Traveling state determination unit 111 determines whether the vehicle is traveling in the tunnel. Hue discriminator 112 discriminates the hue of the captured image when traveling state determination unit 111 determines that the vehicle is traveling in the tunnel. Color difference correction unit 113 corrects the color difference information about the captured image in accordance with the discrimination result of hue discriminator 112. Display 18 displays the captured image corrected by color difference correction unit 113.

In vehicle-mounted display device 1A, the hue of the tunnel outside image is maintained, and only the hue of the tunnel inside image is corrected, so that the image captured during the traveling inside the tunnel can be expressed with the natural hue as a whole.

Second Exemplary Embodiment

Figure 7:
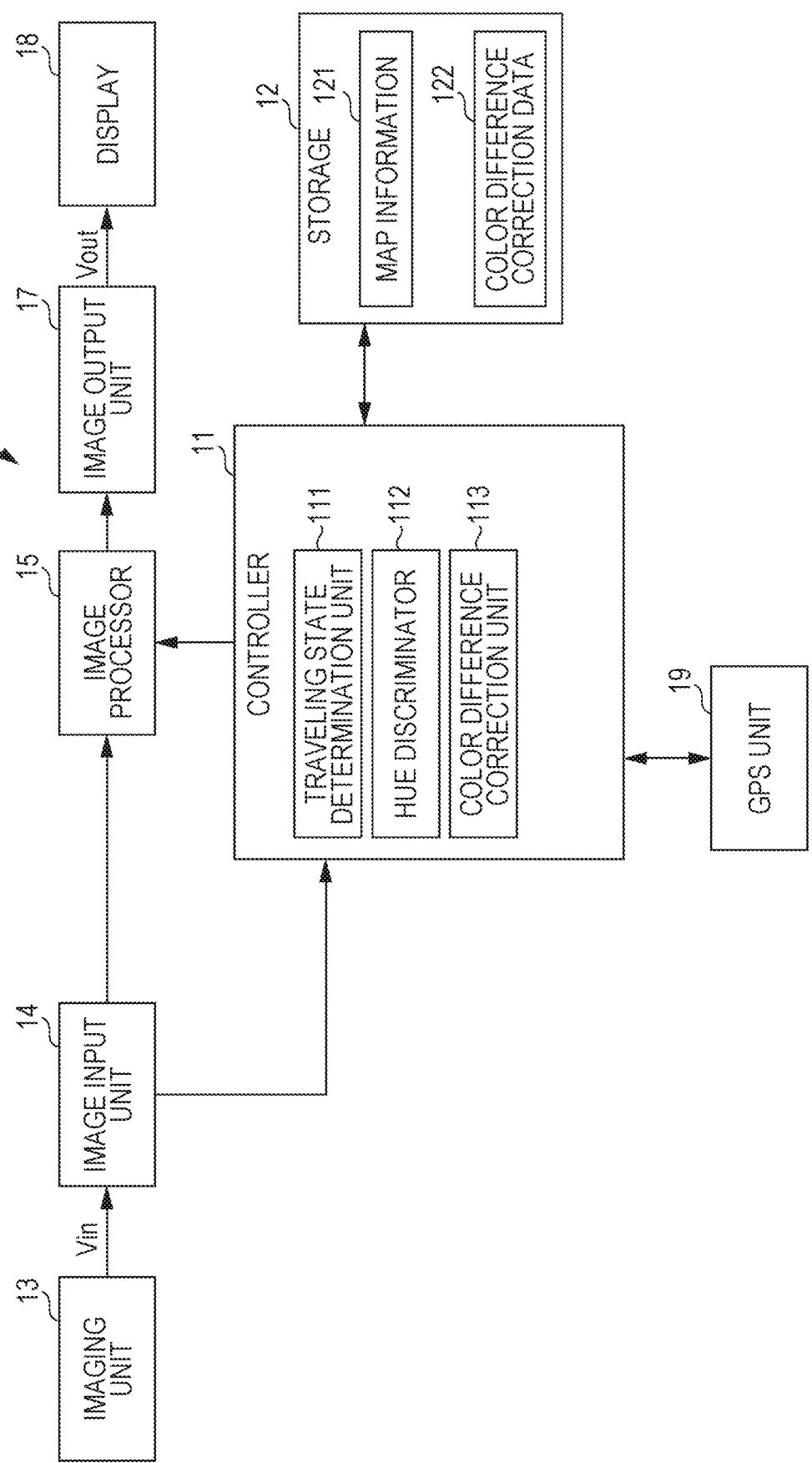
FIG. 7 is a view illustrating a vehicle-mounted display device according to a second exemplary embodiment.

FIG. 7 is a view illustrating vehicle-mounted display device 1B according to a second exemplary embodiment. Vehicle-mounted display device 1B differs from vehicle-mounted display device 1A (see FIG. 2) of the first exemplary embodiment in that storage 12 previously stores color difference correction data 122. Other configurations are similar to those of the first exemplary embodiment, so that the overlapping description will be omitted.

Figure 8A:
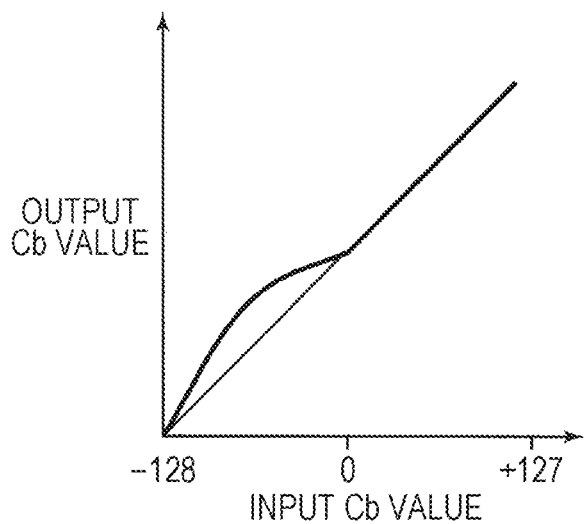
FIG. 8A is a view illustrating an example of color difference correction data applicable in the second exemplary embodiment.
Figure 8B:
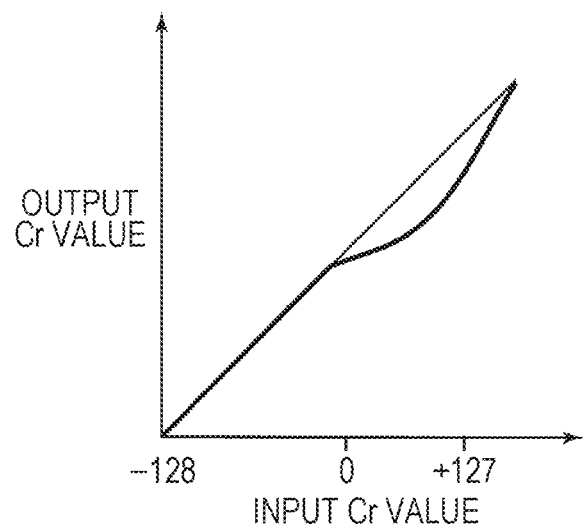
FIG. 8B is a view illustrating an example of the color difference correction data applicable in the second exemplary embodiment.
Figure 8C:
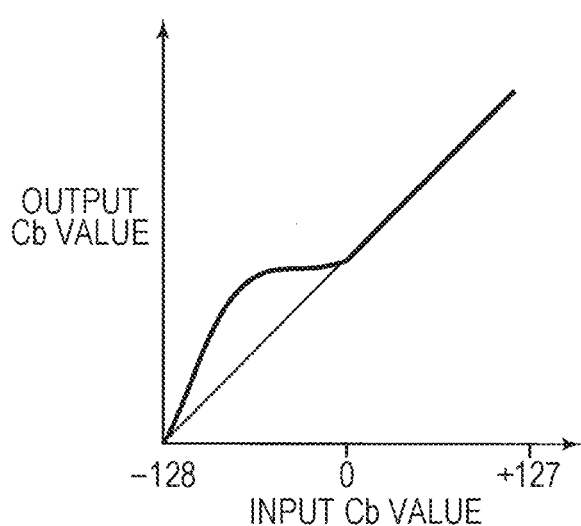
FIG. 8C is a view illustrating an example of the color difference correction data applicable in the second exemplary embodiment.
Figure 8D:
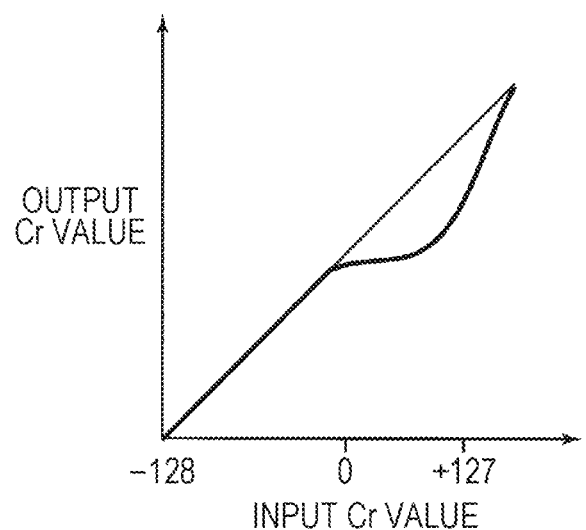
FIG. 8D is a view illustrating an example of the color difference correction data applicable in the second exemplary embodiment.
Figure 8E:
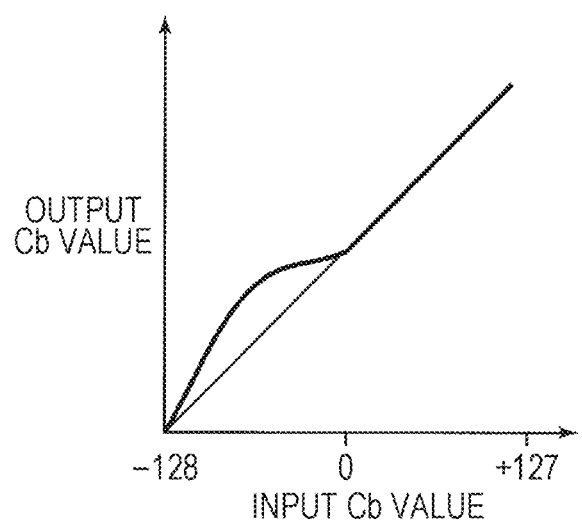
FIG. 8E is a view illustrating an example of the color difference correction data applicable in the second exemplary embodiment.

FIGS. 8A to 8E are views illustrating examples of color difference correction data 122 previously stored in storage 12. FIGS. 8A and 8B illustrate first color difference correction data (color difference correction curve) used in the case that the hue of the captured image is close to orange. FIGS. 8C and 8D illustrate second color difference correction data used in the case that the hue of the captured image is close to yellow. FIG. 8E illustrates third color difference correction data used in the case that the hue of the captured image is close to green. For example, these color difference correction curves are previously generated on an experimental basis.

Figure 9:
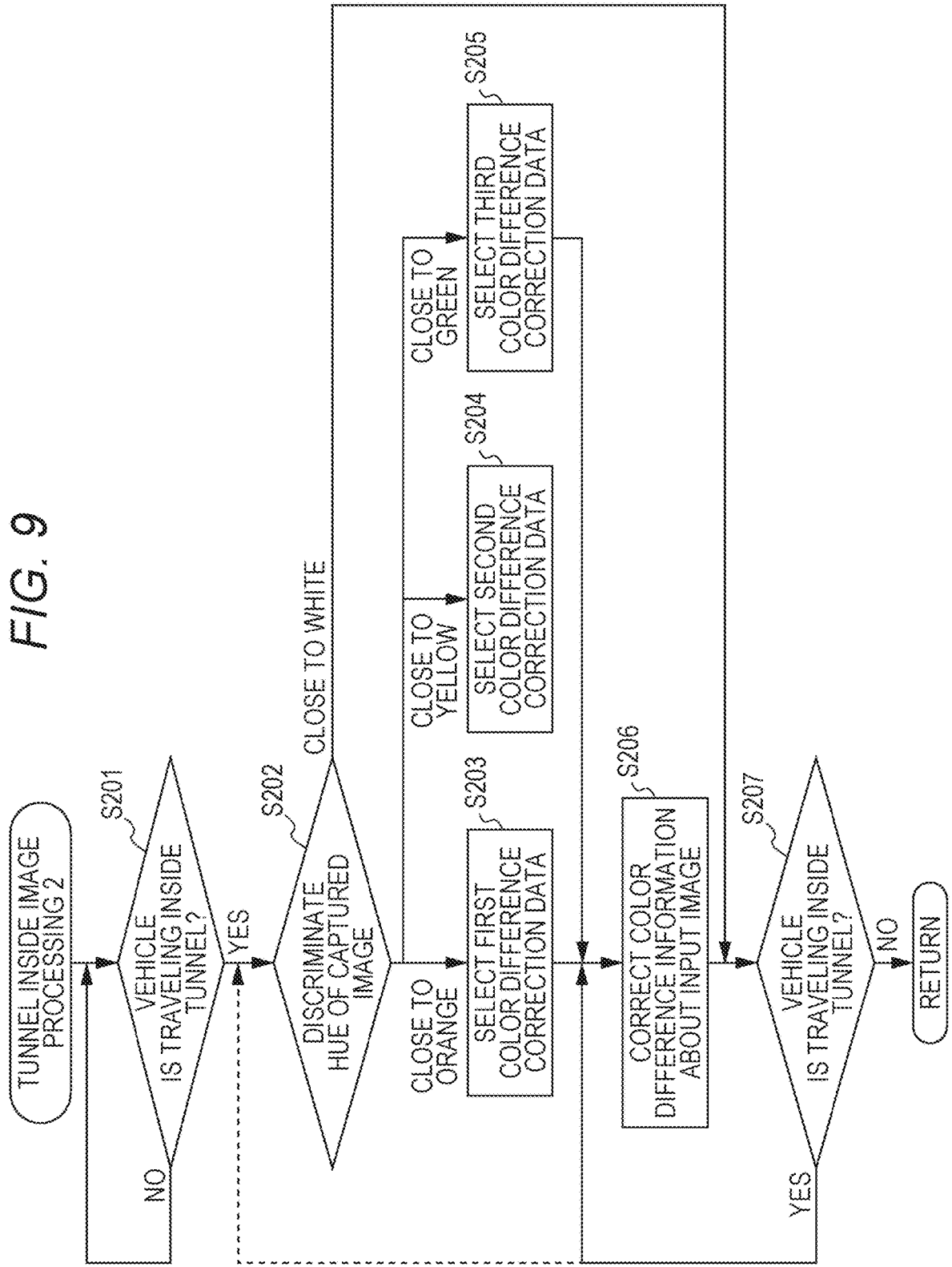
FIG. 9 is a flowchart illustrating an example of image processing in the second exemplary embodiment.

FIG. 9 is a flowchart illustrating an example of tunnel inside image processing 2 in vehicle-mounted display device 1B. Only the processing different from that in the flowchart of the first exemplary embodiment (see FIG. 4) will be described.

In step S202, controller 11 discriminates what color the light source (lighting) inside the tunnel is close to, namely, discriminates the hue of the captured image (the processing is performed by hue discriminator 112). The hue discrimination is performed similarly to the first exemplary embodiment, and the hue of the captured image is classified into the captured image close to orange, the captured image close to yellow, the captured image close to green, and the captured image close to white.

In the case that the captured image is close to orange, controller 11 selects first color difference correction data in step S203 (see FIGS. 8A and 8B, the processing is performed by color difference correction unit 113). In the case that the captured image is close to yellow, controller 11 selects second color difference correction data in step S204 (see FIGS. 8C and 8D, the processing is performed by color difference correction unit 113). In the case that the captured image is close to green, controller 11 selects third color difference correction data in step S205 (see FIG. 8E, the processing is performed by color difference correction unit 113). That is, controller 11 selects color difference correction data 122 to be applied from a plurality of pieces of color difference correction data 122 according to the discrimination result of hue discriminator 112. In the case that the captured image is close to white, it is considered that the necessity of correction of the color difference information is eliminated, so that the flowchart transfers to the processing in step S207.

In step S206, controller 11 corrects the color difference information about the captured image based on selected color difference correction data 122. When controller 11 determines that the vehicle does not travel inside the tunnel, namely when controller 11 determines that the vehicle has gone out of the tunnel (NO in step S207), the series of pieces of tunnel inside image processing is ended, and the flowchart transfers to the processing in step S201. When controller 11 determines that the vehicle is traveling inside the tunnel (YES in step S207), the flowchart transfers to the processing in step S206. That is, the color difference information is corrected according to selected color difference correction data 122 until the vehicle has gone out of the tunnel.

When the determination that the vehicle is traveling inside the tunnel is made in step S207, as illustrated in a broken line in FIG. 9, the flowchart; may transfer to the processing in step S202 to deal with a change in hue.

Thus, vehicle-mounted display device 113 of the second exemplary embodiment includes storage 12 that stores the plurality of pieces of color difference correction data 122 to be used to correct the color difference information about the captured image in addition to the configuration of vehicle-mounted display device 1A of the first exemplary embodiment. Color difference correction unit 113 selects color difference correction data 122 to be applied from the plurality of pieces of color difference correction data 122 in accordance with the discrimination result of hue discriminator 112, and corrects the color difference information about the captured image based on selected color difference correction data 122. Consequently a processing load on controller 11 is reduced.

Third Exemplary Embodiment

Figure 10:
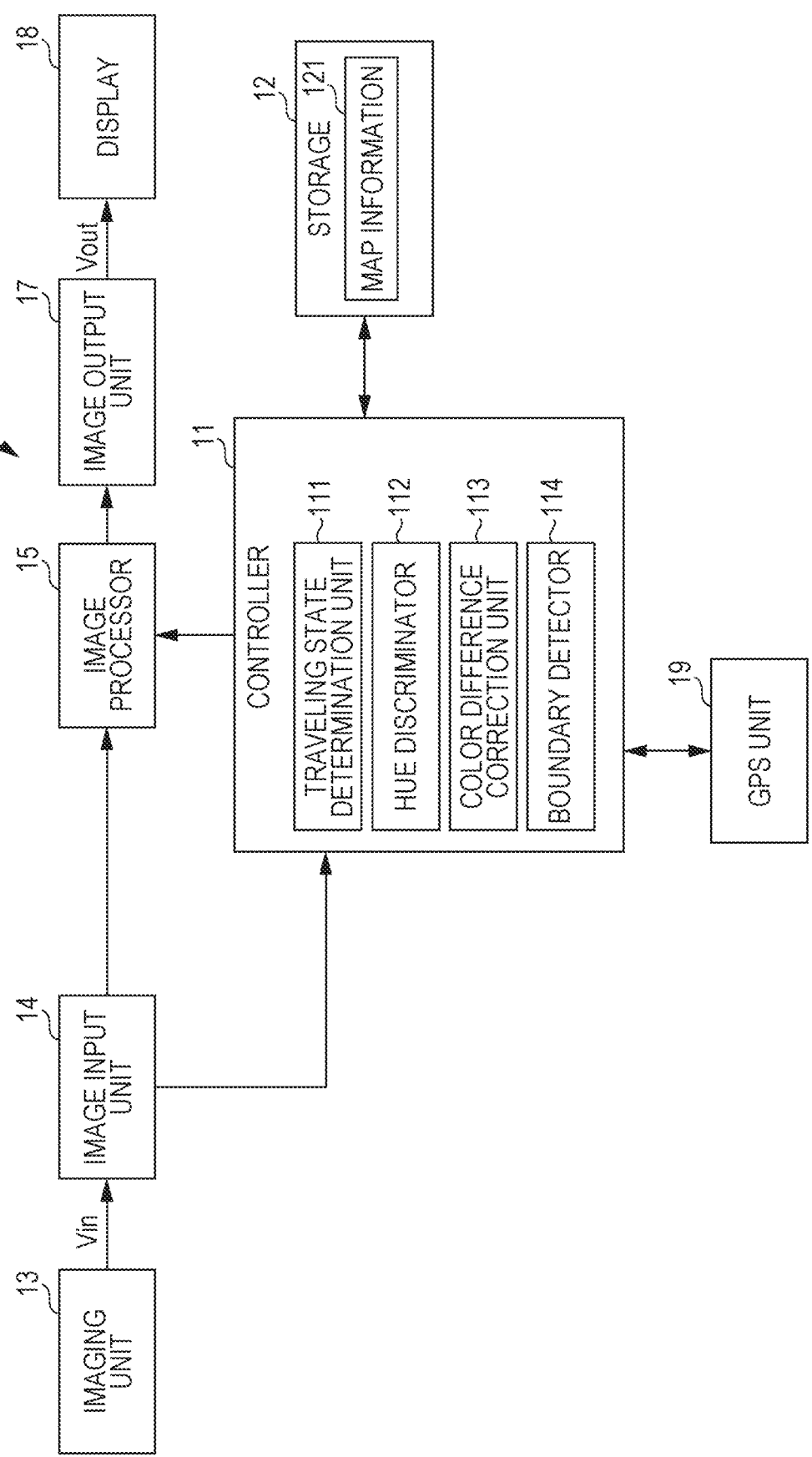
FIG. 10 is a view illustrating a vehicle-mounted display device according to a third exemplary embodiment.

FIG. 10 is a view illustrating vehicle-mounted display device according to a third exemplary embodiment. Vehicle-mounted display device 1C differs from vehicle-mounted display device 1A of the first exemplary embodiment (see FIG. 2) in that controller 11 acts as boundary detector 114. Other configurations are similar to those of the first exemplary embodiment, so that the overlapping description will be omitted.

Figure 11:
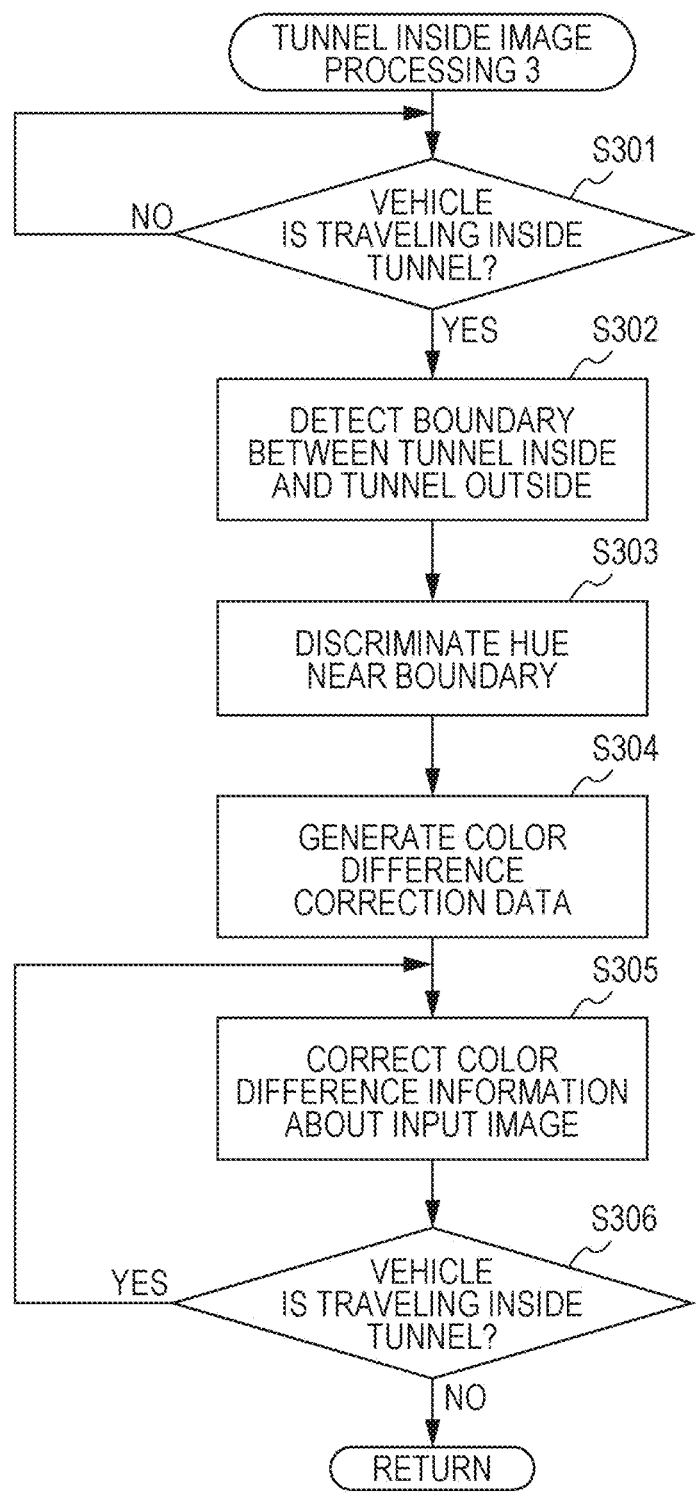
FIG. 11 is a flowchart illustrating an example of image processing in the third exemplary embodiment.

FIG. 11 is a flowchart illustrating an example of tunnel inside image processing 3 in vehicle-mounted display device 1C. Only the processing different from that in the flowchart of the first exemplary embodiment (see FIG. 4) will be described.

In step S302, controller 11 detects a boundary between the tunnel inside and the tunnel outside in the captured image (the processing is performed by boundary detector 114). The boundary between the tunnel inside and the tunnel outside is detected by applying a known technique based on, for example, luminance information, edge information, or saturation information.

In step S303, controller 11 discriminates what color the hue of a certain area near the boundary between the tunnel inside and the tunnel outside is close to, namely, discriminates the hue of the captured image (the processing is performed by hue discriminator 112). The hue discrimination is performed similarly to the first exemplary embodiment.

In step S304, controller 11 generates the color difference correction data. In the case that the blue color difference correction data is generated, blue color difference information Cb in the certain area near a boundary line is set to an inflection point of the Cb correction curve. Blue color difference information Cb near the boundary line may be the average value or the maximum value of blue color difference information Cb in the certain area.

Figure 12A:
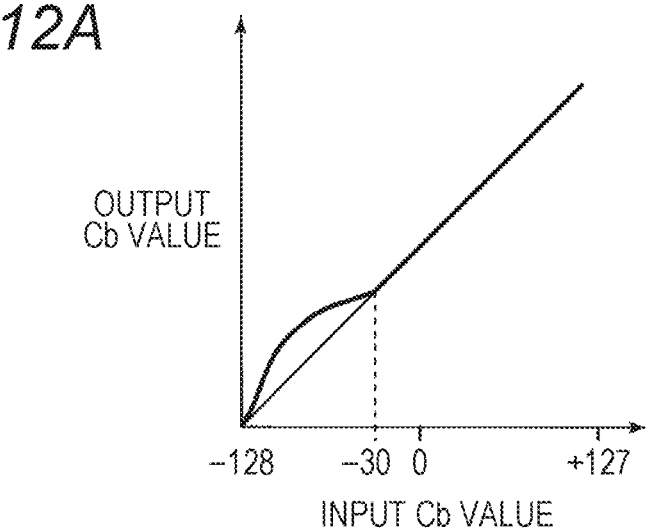
FIG. 12A is a view illustrating an example of the color difference correction data generated in the third exemplary embodiment.
Figure 12B:
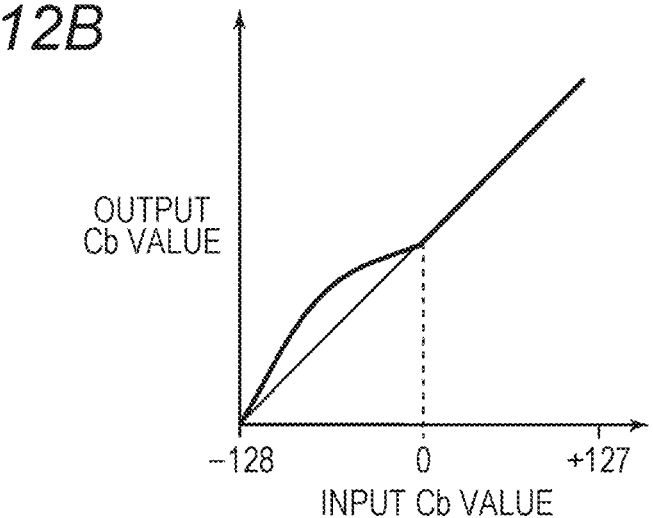
FIG. 12B is a view illustrating an example of the color difference correction data generated in the third exemplary embodiment.
Figure 12C:
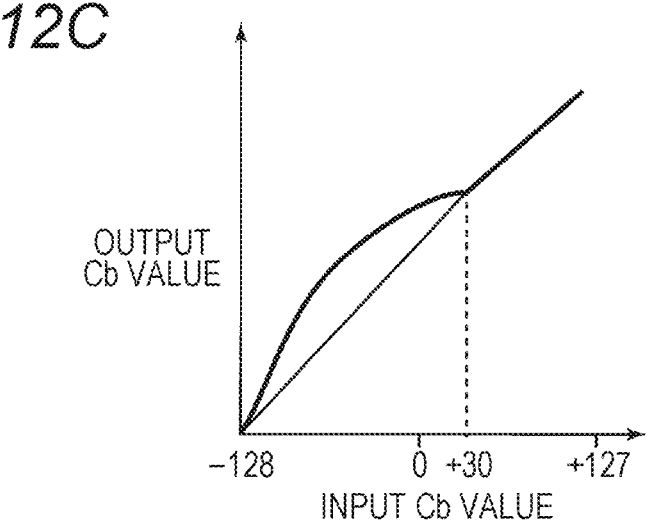
FIG. 12C is a view illustrating an example of the color difference correction data generated in the third exemplary embodiment.

For example, the Cb correction curve in FIG. 12A is generated in the case that blue color difference information Cb in the certain area near the boundary line is −30. The Cb correction curve in FIG. 12B is generated in the case that blue color difference information Cb in the certain area near the boundary line is 0. The Cb correction curve in FIG. 12C is generated in the case that blue color difference information Cb in the certain area near the boundary line is +30. The red color difference correction data (Cr correction curve) is similarly generated.

In step S305, controller 11 controls image processor 15 to correct blue color difference information Cb and red color difference information Cr of the input image according to the blue color difference correction data (Cb correction curve) and red color difference correction data (Cr correction curve) obtained in step S304 (the processing is performed by color difference correction unit 113). The image subjected to the color difference correction is displayed on display 18.

When controller 11 determines that the vehicle does not travel inside the tunnel, namely, when controller 11 determines that the vehicle has gone out of the tunnel (NO in step S306), the series of pieces of tunnel inside image processing is ended, and the flowchart transfers to the processing in step S301. When controller 11 determines that the vehicle is traveling inside the tunnel (YES in step S306), the flowchart transfers to the processing in step S305. That is, the color difference information is corrected according to the generated color difference correction data until the vehicle has gone out of the tunnel.

When the determination that the vehicle is traveling inside the tunnel is made in step S306, the change in hue may be monitored, and the pieces of processing from step S304 may be performed to deal with the change in hue when the hue changes. It is considered that the hue changes in the case that a traveling place transfers to the tunnel inside not to include the tunnel inside image in the captured image. In this case, the boundary between the tunnel inside and the tunnel outside is not detected, so that the hue is discriminated similarly to the first exemplary embodiment.

Thus, vehicle-mounted display device 1C of the third exemplary embodiment includes boundary detector 114 that detects the boundary area between the tunnel inside and the tunnel outside in the captured image in addition to the configuration of vehicle-mounted display device 1A of the first exemplary embodiment. Hue discriminator 112 discriminates the hue in the boundary area detected by boundary detector 114. Consequently, the correction can be performed more properly on the tunnel inside image in which the hue correction is needed.

Fourth Exemplary Embodiment

Figure 13:
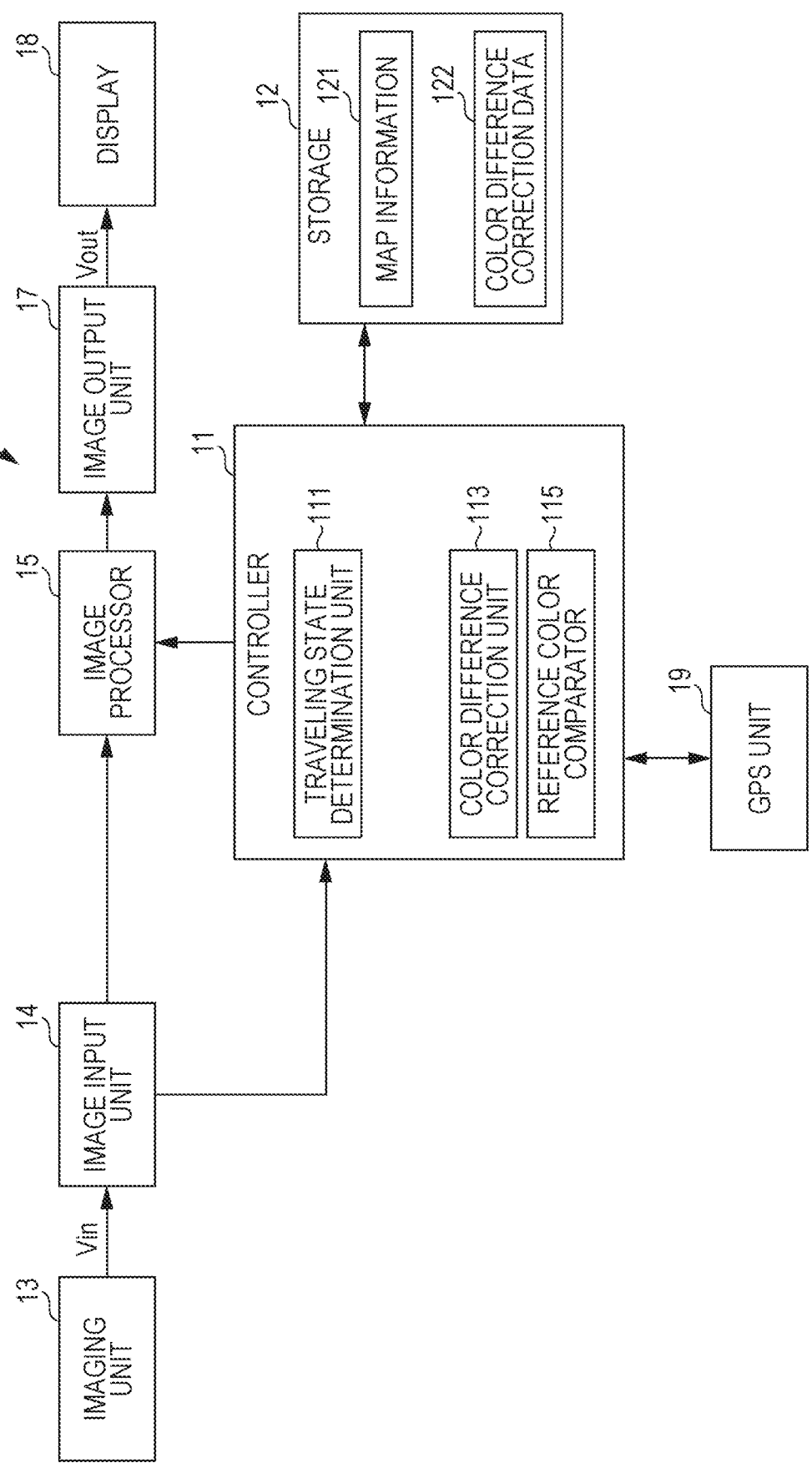
FIG. 13 is a view illustrating a vehicle-mounted display device according to a fourth exemplary embodiment.

FIG. 13 is a view illustrating vehicle-mounted display device 1D according to a fourth exemplary embodiment. Vehicle-mounted display device 1D differs from vehicle-mounted display device 1A of the first exemplary embodiment (see FIG. 2) in that storage 12 previously stores color difference correction data 122 and that controller 11 acts as reference color comparator 115. In the fourth exemplary embodiment, reference color comparator 115 performs the processing equivalent to hue discriminator 112. Other configurations are similar to those of the first exemplary embodiment, so that the overlapping description will be omitted.

In the fourth exemplary embodiment, N sets of pieces of color difference correction data 122 (the Cb correction curve and the Cr correction curve) are previously stored in storage 12. Color information (red information R, blue information B, green information G) indicating a white line under sunlight is previously acquired as reference color information. The reference color information may be updated at predetermined time intervals, or an average value of a plurality of times may be set to the reference color information. The reference color information may be acquired for each time zone, and the reference color information that serves as a target may be changed according to a current time.

Figure 14:
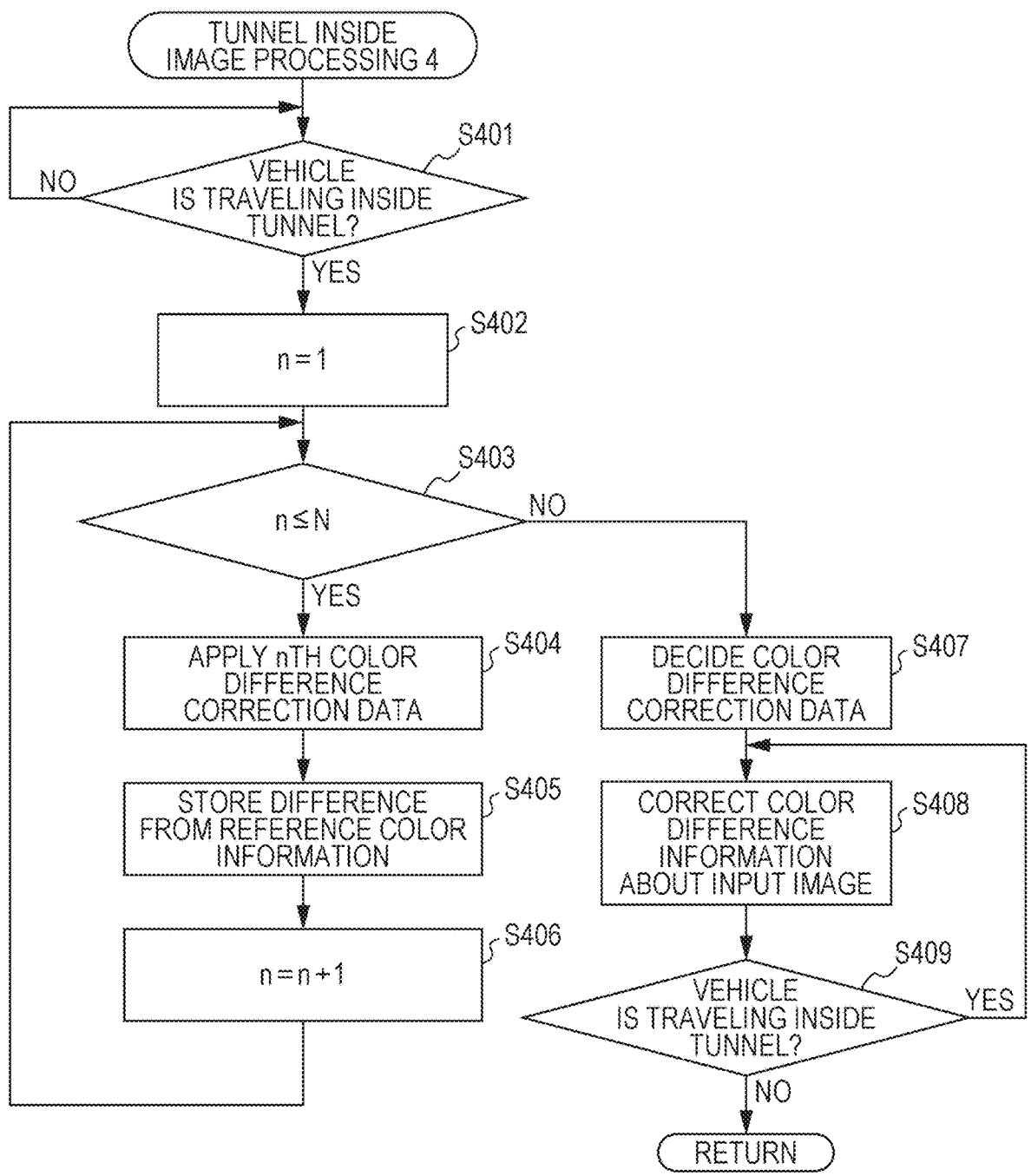
FIG. 14 is a flowchart illustrating an example of image processing in the fourth exemplary embodiment.

FIG. 14 is a flowchart illustrating an example of tunnel inside image processing 4 in vehicle-mounted display device 1D. Only the processing different from that in the flowchart of the first exemplary embodiment (see FIG. 4) will be described.

In steps S402 to S407, controller 11 acts as reference color comparator 115. That is, in step S402, controller 11 sets an argument n to "1". In step S403, controller 11 determines whether the argument n is less than or equal to a total N of the pieces of color difference correction data. When the argument n is less than or equal to the total N (YES in step S403), the flowchart transfers to the processing in step S404. In step S404, controller 11 corrects the hue of the input image by applying nth color difference correction data. In step S405, controller 11 acquires the color information about the white line subjected to the color difference correction, compares the color information to the reference color information, and stores a comparison result in the RAM. In step S406, controller increments the argument n by 1. The pieces of processing in steps S403 to S406 are repeated until the argument n reaches the total N. When the argument n is determined to be greater than the total N (NO in step S403), the flowchart transfers to the processing in step S407.

In step S407, controller 11 decides the color difference correction data based on a comparison result in step S405. Specifically, the color difference correction data in which the color information about the white line becomes closest to the reference color information is used, and the color difference correction is performed according to the color difference correction data until the vehicle has gone out of the tunnel. Reference color comparator 115 does not directly discriminate the hue of the captured image, but it is said that reference color comparator 115 discriminates the hue by the comparison to the reference color information.

In step S408, controller 11 corrects the color difference information about the captured image based on decided color difference correction data 122. The image subjected to the color difference correction is displayed on display 18.

When the vehicle has gone out of the tunnel (NO in step S409), the series of pieces of tunnel inside image processing is ended, and the flowchart transfers to the processing in step S401. The color difference information is corrected according to the generated color difference correction data until the vehicle has gone out of the tunnel. When the determination that the vehicle is traveling inside the tunnel is made in step S409, the change in hue may be monitored, and the pieces of processing from step S402 may be performed to deal with the change in hue when the hue changes.

In the fourth exemplary embodiment, N pieces of color difference correction data are prepared. Alternatively, the color difference correction data applied to the color difference correction may be decided by gradually changing the Cb correction curve and the Cr correction curve until the color information about the white line is matched with the reference color information that serves as the target.

Although the invention made by the present inventors has been specifically described above based on the exemplary embodiments, the present invention is not limited to the above exemplary embodiments, but can be modified without departing from the gist of the present invention.

For example, in the above exemplary embodiments, the color difference correction data applied to the color difference correction may be stored in storage 12, and the stored color difference correction data may be applied when the vehicle is traveling inside the same tunnel next time. The stored color difference correction data may be used as one of candidates when the vehicle is traveling inside a different tunnel.

For example, a priority may be given to preference of a user with respect to the color difference correction data applied to the color difference correction, and the user may previously select the color difference correction data from the plurality of pieces of color difference correction data. The color difference correction data applied to the color difference correction may be switched according to a traveling place (such as the vicinity of the tunnel entrance and the vicinity of the tunnel center) inside the tunnel.

Fine adjustment may be performed by performing gamma correction after the color difference correction is performed. A color gain may be adjusted together with the color difference correction and the gamma correction.

It should be construed that the exemplary embodiments disclosed herein are illustrative in all aspects, and are not restrictive. The scope of the present invention is represented by the scope of the claims and not by the above description, and it is intended that all modifications within the sense and scope equivalent to the claims are involved in the scope of the present invention.

INDUSTRIAL APPLICABILITY

The present invention is suitable for the vehicle-mounted display device such as the electronic mirror device.

REFERENCE MARKS IN THE DRAWINGS 1A to 1D: vehicle-mounted display device
11: controller
111: traveling state determination unit
112: hue discriminator
113: color difference correction unit
114: boundary detector
115: reference color comparator
12: storage
121: map information
122: color difference correction data
13: imaging unit
14: image input unit
15: image processor
17: image output unit
18: display
19: GPS unit IMG1: tunnel inside image
IMG2: tunnel outside image
V: vehicle
$V_{in}$: input image signal.
$V_{out}$: output image signal

The invention claimed is:

1. A vehicle-mounted display device comprising:
an imaging unit that captures an image of a surrounding of a vehicle;
at least one processor;
at least one memory coupled to the at least one processor, the at least one memory storing at least one program that, when executed by the at least one processor, causes the vehicle-mounted display device to:
determine whether the vehicle is traveling in a tunnel,
detect a boundary area between an inside and an outside of the tunnel in the image when the vehicle is determined to be traveling in the tunnel,
discriminate a hue in the boundary area of the image, and
correct color difference information about the image in accordance with a discrimination result of the hue; and
a display that displays the image, of which the color difference information is corrected.

2. The vehicle-mounted display device according to claim 1, wherein the at least one program causes the vehicle-mounted display device to generate at least one piece of color difference correction data to be used to correct the color difference information about the image, and correct the color difference information about the image based on the at least one piece of color difference correction data.

3. The vehicle-mounted display device according to claim 1, wherein the at least one memory further stores at least one piece of color difference correction data to be used to correct the color difference information about the image, and
wherein the at least one program causes the vehicle-mounted display device to select a piece of color difference correction data to be used from the at least one piece of color difference correction data, and correct the color difference information about the image based on the piece of color difference correction data.

4. The vehicle-mounted display device according to claim 2, wherein
the at least one piece of color difference correction data includes blue color difference correction data to be used to correct blue color difference information, and
based on the blue color difference correction data, the at least one program causes the vehicle-mounted display device not to convert the blue color difference information when the blue color difference information has an input value of a blue color difference greater than a first threshold, and to covert the blue color difference information to have an output value of the blue color difference greater than the input value of the blue color difference when the blue color difference information has the input value of the blue color difference less than or equal to the first threshold.

5. The vehicle-mounted display device according to claim 2, wherein
the at least one piece of color difference correction data includes red color difference correction data to be used to correct red color difference information, and
based on the red color difference correction data, the at least one program causes the vehicle-mounted display device not to convert the red color difference information when the red color difference information has an input value of a red color difference less than a second threshold, and to covert the red color difference information to have an output value of the red color difference less than the input value of the red color difference when the red color difference information has the input value of the red color difference greater than or equal to the second threshold.

6. A vehicle-mounted display device comprising:
an imaging unit that captures an image of a surrounding of a vehicle;
at least one processor;
at least one memory coupled to the at least one processor, the at least one memory storing at least one program that, when executed by the at least one processor, causes the vehicle-mounted display device to:
determine whether the vehicle is traveling in a tunnel,
discriminate a hue in a boundary area between an inside and an outside of the tunnel in the image when the vehicle is determined to be traveling in the tunnel, and
correct color difference information about the image in accordance with a discrimination result of the hue; and
a display that displays the image, of which the color difference information is corrected,
wherein the at least one memory further stores at least one piece of color difference correction data to be used to correct the color difference information about the image, and
wherein the at least one program causes the vehicle-mounted display device to select a piece of color difference correction data to be used from the at least one piece of color difference correction data, and corrects the color difference information about the image based on the piece of color difference correction data.

7. A vehicle-mounted display device comprising:
an imaging unit that captures an image of a surrounding of a vehicle;
at least one processor;
at least one memory coupled to the at least one processor, the at least one memory storing at least one program that, when executed by the at least one processor, causes the vehicle-mounted display device to:
determine whether the vehicle is traveling in a tunnel,
detect a boundary area between an inside and an outside of the tunnel in the image when the vehicle is determined to be traveling in a tunnel,
discriminate a hue in the boundary area of the image,
generate at least one piece of color difference correction data, the at least one piece of color difference correction data includes at least one of blue color difference correction data to be used to correct blue color difference information and red color difference correction data to be used to correct red color difference information, and
correct color difference information about the image in accordance with a discrimination result of the hue and based on the at least one piece of color difference correction data; and
a display that displays the image, of which the color difference information is corrected,
wherein the at least one piece of color difference correction data includes blue color difference correction data to be used to correct blue color difference information, and the at least one program, when executed by the at least one processor, causes the vehicle-mounted display device to not convert the blue color difference information when the blue color difference information has an input value of a blue color difference greater than a first threshold, and to covert the blue color difference information to have an output value of the blue color difference greater than the input value of the blue color difference when the blue color difference information has the input value of the blue color difference less than or equal to the first threshold, or wherein the at least one piece of color difference correction data includes red color difference correction data to be used to correct red color difference information, and the at least one program, when executed by the at least one processor, causes the vehicle-mounted display device to not convert the red color difference information when the red color difference information has an input value of a red color difference less than a second threshold, and to covert the red color difference information to have an output value of the red color difference less than the input value of the red color difference when the red color difference information has the input value of the red color difference greater than or equal to the second threshold.

\* \* \* \* \*